US012006912B2

(12) United States Patent
Buzdalek et al.

(10) Patent No.: US 12,006,912 B2
(45) Date of Patent: Jun. 11, 2024

(54) METHOD OF INSTALLING ROTOR BLADES ON AN OFFSHORE WIND TURBINE

(71) Applicant: Vestas Wind Systems A/S, Aarhus (DK)

(72) Inventors: Sedin Buzdalek, Randers (DK); Peter Sigfred Mortensen, Risskov (DK); Ben Møller Nielsen, Aarhus (DK); Torben Damsgaard, Mårslet (DK); Mads Møller Kristensen, Aarhus (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 17/795,714

(22) PCT Filed: Mar. 2, 2021

(86) PCT No.: PCT/DK2021/050063
§ 371 (c)(1),
(2) Date: Jul. 27, 2022

(87) PCT Pub. No.: WO2021/175398
PCT Pub. Date: Sep. 10, 2021

(65) Prior Publication Data
US 2023/0104098 A1    Apr. 6, 2023

(30) Foreign Application Priority Data
Mar. 6, 2020   (EP) .................................... 20161495

(51) Int. Cl.
*F03D 13/25*     (2016.01)
*F03D 13/10*     (2016.01)

(52) U.S. Cl.
CPC ............. *F03D 13/25* (2016.05); *F03D 13/10* (2016.05)

(58) Field of Classification Search
None
See application file for complete search history.

(56) References Cited

U.S. PATENT DOCUMENTS 11,383,799 B2 * 7/2022 Colmard ................. B63B 35/44
2013/0019792 A1  1/2013 Jahnig et al.
(Continued)

FOREIGN PATENT DOCUMENTS

| EP | 3225835 A1 | 10/2017 |
| WO | 2010110330 A1 | 9/2010 |
| WO | 2019091021 A1 | 5/2019 |

OTHER PUBLICATIONS

European Patent Office, Extended European Search Report in EP20161495.5, Oct. 5, 2020.
(Continued)

*Primary Examiner* — Juan G Flores
(74) *Attorney, Agent, or Firm* — Wood Herron & Evans LLP

(57) ABSTRACT

A method of installing rotor blades on an offshore wind turbine includes arranging a tower of the wind turbine at an offshore installation site. Then a first end of a tensioner is fastened to at least one of the tower, the nacelle, and the hub at a distance above sea level. A second end of the tensioner is fastened to a holding device floating in the sea at a distance from the tower. Then a pulling force is applied to the tensioner from the holding device at least part of the time while the rotor blades are being mounted to the hub, so that oscillations of the tower due to external forces are dampened during installation of the rotor blades.

15 Claims, 3 Drawing Sheets

(56) References Cited

U.S. PATENT DOCUMENTS

2020/0391834 A1* 12/2020 Colmard ................ B63B 77/10
2021/0396214 A1* 12/2021 Andersen ............... B63B 27/32

OTHER PUBLICATIONS

European Patent Office, International Search Report and Written Opinion in PCT Application No. PCT/DK2021/050063, Jun. 7, 2021.

* cited by examiner

METHOD OF INSTALLING ROTOR BLADES ON AN OFFSHORE WIND TURBINE

FIELD OF THE INVENTION

The present invention relates to a method of installing rotor blades on an offshore wind turbine, and in particular, it relates to such a method which comprises dampening of the oscillations of the tower arising due to e.g. waves in the surrounding sea.

BACKGROUND OF THE INVENTION

When offshore wind turbines are to be installed at the installation site, the tower is first mounted to a foundation, and the hub and the nacelle are mounted. Then the blades are lifted up and mounted. However, the external forces from the waves and soil conditions and swell applied to the tower cause movements of the tower that can make it difficult or even impossible to mount the blades, especially in harsh weather conditions. The resulting delay of the installation process can cause a significant increase in the total installation costs, especially because the already large cost of using the installation ship becomes a higher amount of the total cost, if it has to wait for better weather.

Hence, an improved method of installing rotor blades on an offshore wind turbine would be advantageous.

OBJECT OF THE INVENTION

It is an object of the present invention to provide a method of installing rotor blades on an offshore wind turbine with which method the installation work can be performed in worse weather conditions than with the known methods.

It is another object of the present invention to provide a method of installing rotor blades on an offshore wind turbine with which method the installation work is made more efficient than with known methods.

It is a further object of the present invention to provide an alternative to the prior art.

In particular, it may be seen as an object of the present invention to provide a method that alleviates, mitigates or eliminates one or more of the above or other disadvantages or problems singly or in any combination.

SUMMARY OF THE INVENTION

Thus, the above-described object and several other objects are intended to be obtained by providing a method of installing rotor blades on an offshore wind turbine, the method comprising the steps of:

arranging a tower of the wind turbine at an offshore installation site, the tower having a nacelle and a hub mounted thereon, fastening a first end of a tensioner to at least one of the tower, the nacelle, and the hub at a distance above sea level, fastening a second end of the tensioner to a holding device floating in the sea at a distance from the tower, and applying a pulling force to the tensioner from the holding device at least part of the time while the rotor blades are being mounted to the hub, so that oscillations of the tower due to external forces are dampened during installation of the rotor blades.

The tensioner typically comprises a rope or a wire, but the scope of protection also covers other types of tensioners and parts thereof, such as a chain or a strap.

The external forces which cause the undesired oscillations of the tower are in particular the waves in the surrounding sea as well as movements from poor soil conditions and swell applied to the foundation of the wind turbine which is then transferred to the tower. This means that an effect of the invention is to counteract the variations over time of the influences from these external forces and thereby to limit the movements of the tower that can otherwise make it difficult or even impossible to mount the rotor blades. Thereby it will become possible and safe to perform the installation work also during periods with weather conditions that would otherwise make it necessary to postpone the further work.

The holding device may be kept at a substantially constant location with respect to the tower during the whole installation process. However, it may also be desired and possible to move the holding device between different locations, e.g. if the main direction of the waves changes.

The use of the terms "a tensioner" and "a holding device" does not exclude that there could be more than one as will also be described below. Furthermore, the tensioner may be composed of a number of different elements which in total make up the tensioner.

The use of the term "a pulling force" does not exclude that the pulling force may vary over time, e.g. if the weather situation changes and causes larger waves. It may also be relevant to change the pulling force in response to an actual number of already installed blades at a given time as that would change the actual oscillating mass and the centre of gravity of the wind turbine being installed.

In presently preferred embodiments of the invention, the first end of the tensioner is fastened to the tower at an upper region of the tower adjacent to the nacelle. This may be done by arranging a part of the tensioner circumferentially around an outer surface of the tower. Hereby it has been found possible to dampen the oscillations without applying potentially locally overloading forces to the tower construction. Other options will be to fasten the first end of the tensioner to the tower e.g. via holes in the wall of the tower or by use of brackets fastened to the tower. Alternatively, the first end can be fastened to the nacelle or to the hub e.g. by use of designated fastening points, such as brackets or holes.

When the first end of the tensioner is fastened to the tower as just described, including by arranging a part of the tensioner circumferentially around an outer surface of the tower, this may be done in a manner wherein the part of the tensioner that is in contact with the outer surface of the tower is covered by a sleeve made of a material having a higher frictional coefficient in relation to the outer surface of the tower than a corresponding frictional coefficient of the part of the tensioner not being provided with the sleeve. Hereby it can be ensured that the tensioner stays in the desired position without sliding down. An example of such an arrangement will be shown in the figures.

It may be advantageous to design the tensioner so that some regions thereof have a higher tensile strength than the main part of the tensioner. Such regions of higher strength could e.g. be where the tensioner engages with at least one of the tower, the nacelle, and the hub. Hereby it will be possible to avoid breakage of the tensioner due to stress concentrations arising from the fastening.

The tensioner may have a local region having a lower tensile strength than the rest of the tensioner. Such a local region may e.g. be established by a bolt connection having a predetermined tensile strength. By building-in such a local region of lower strength, it can be obtained that if the pulling force applied to the tensioner results in the tensile stress in the tensioner exceeding the fracture strength of the tensioner in the local region, the tensioner will break here. Hereby it is possible to keep control of where the tensioner will be break so that it can be in a region where the consequences of a fracture is as un-critical as possible in relation to the people performing the installation, to the surrounding equipment, such as the holding device, and to the wind turbine being installed. Another safety effect is that it can be ensured that the tensile force in the tensioner does not increase above a known size. Thus, by designing the tensioner in this way, it can be ensured that the force applied at the first end of the tensioner will not damage the fastening point, such as the outer surface of the tower or other connection points. The element forming the local region of lower strength should preferably be easy to replace so that the installation work can be continued after the replacement.

Another way of ensuring that the structural integrity of the tower is not affected by the pulling force will be explained below in relation to embodiments wherein the holding device is a vessel comprising a winch.

A local region having a lower tensile strength may be located between 30 and 100 m, such as between 40 and 60 m, from the position where the first end of the tensioner is fastened to the wind turbine. Hereby it can be ensured that the ends of the broken tensioner will fall downwards at positions where it is least likely to cause damage.

In presently preferred embodiments of the invention, at least a part of the tensioner is a rope made from ultra-high-molecular-weight polyethylene (UHMWPE), such as from UHMWPE fibres. UHMWPE is a subset of the thermoplastic polyethylene which has extremely long chains and which usually has a molecular mass between 3.5 and 7.5 million atomic mass unit (amu). An example of such a type of rope is a Dyneema® rope which is a rope that can be up to 15 times stronger than steel, more abrasion resistant than high carbon steel, and which is resistant to UV light. This high stiffness means that if it breaks, it will just fall down, as there is no or very little elastic energy stored therein.

In some embodiments of the invention, the holding device is a powered vessel, such as a tug boat. Hereby it will be easy to move it to a desired position with respect to the tower and to alter the position, e.g. if the main direction of the waves changes due to a change in wind direction.

The vessel may comprise a winch around which the second end of the tensioner is wound so that the winch can be used to adjust a distance between the first and second ends of the tensioner and/or a pulling force applied to the tensioner. In such embodiments, the winch can be provided with a safety mechanism which releases, if the tension in the tensioner exceeds a predetermined limit. Hereby it can be ensured that the structural integrity of the tower is not compromised by the applied pulling force.

Alternatively, the holding device may be an un-powered float, such as a drifting anchor. It could e.g. be a floating block, such as a floating block having a weight of 30-40 tonnes thereby providing a sufficient pulling force due to gravity. Another example is a parachute-like construction that would apply a horizontal force component due to the large area providing resistance against movements. Examples of different designs of the holding device will be shown and described in relation to the figures.

In embodiments of the invention, wherein the holding device is an un-powered float, the un-powered float may connected to a powered vessel that can be used to move the un-powered float between different locations with respect to the tower.

The oscillations of the tower during the installation process should preferably be monitored so that the right pulling force can be applied dependent on the actual movements.

In presently preferred embodiments of the invention, a horizontal component of the pulling force is in a main direction of surrounding waves at the installation site. By "main direction" is preferably meant an average direction in which the waves propagate. The main direction of wave propagation would typically be that of the wind generating the waves. This means that if the direction of the wind changes over time, it may be relevant to move the holding device accordingly.

However, for small changes it may not be relevant as long as the oscillations of the tower can still be dampened sufficiently to enable the installation of the rotor blades. The pulling force may be applied either in the same direction as the wave propagation or against the waves, e.g. depending on the location of the installation vessel.

In any of the above-mentioned embodiments, the pulling force may be predetermined based on one or more of the following parameters: height of the tower, measured oscillations of the tower at a specific height above the sea level, dimensions of the blades, the type of holding device, and the conditions of the sea. This predetermination can e.g. be done by computer simulations, possibly by using input from measurements made during previously performed tests or installation procedures. The term "predetermined" does not necessarily mean that the pulling force is constant. It could also mean that it should be kept within a predetermined range of force values, or that iterative control methods are used aiming for one target average value that may in practise only be the precise actual value at some points in time.

Even though the above description of the invention refers to "a tensioner" and "a holding device", the scope of protection also covers embodiments of the invention, wherein a plurality of tensioners and a corresponding number of holding devices are used simultaneously to apply tensioning forces in more directions to the tower. Hereby it may be easier to ensure that the necessary dampening can be obtained also in harsh weather conditions.

The aspects of the invention will be apparent from and elucidated with reference to the embodiments described hereinafter.

BRIEF DESCRIPTION OF THE FIGURES

The method of installing rotor blades on an offshore wind turbine according to the invention will now be described in more detail with regard to the accompanying figures. The figures show one way of implementing the present invention and is not to be construed as being limiting to other possible embodiments falling within the scope of the attached claim set.

In FIG. 4.a, the float is in the form of a floating block only connected to the tower, and in FIG. 4.b, the float is in the form of a floating block which is connected both to the tower and to a tub-boat.

DETAILED DESCRIPTION OF AN EMBODIMENT

Figure 1:
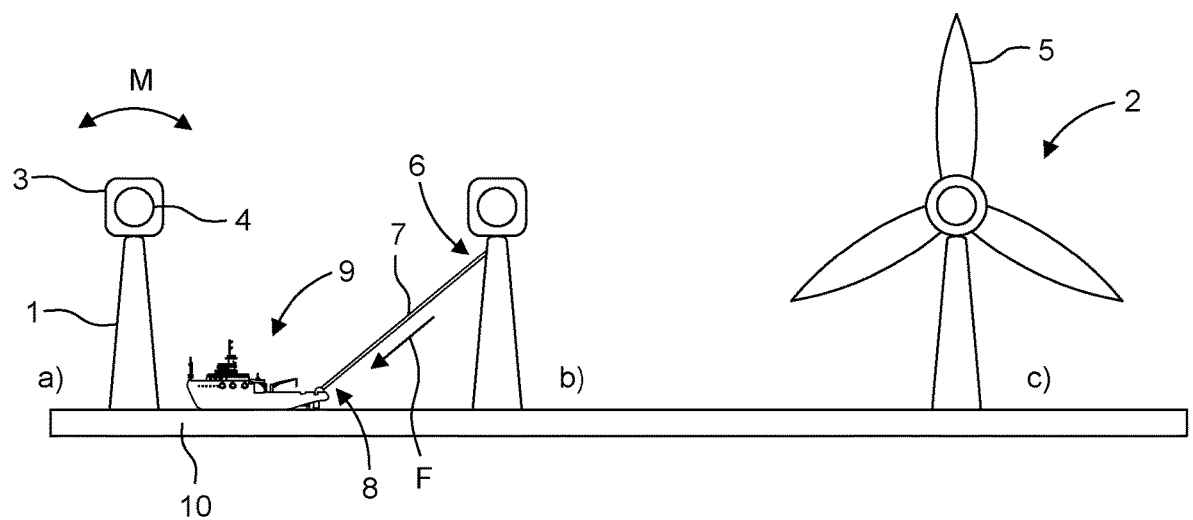
FIG. 1 shows schematically the overall idea of the present invention.

FIG. 1 shows schematically the overall idea of the invention. FIG. 1.a shows a tower 1 of an offshore wind turbine 2 which has been arranged at the offshore installation site. The tower 1 has a nacelle 3 and a hub 4 mounted thereon and is ready for the installation of the rotor blades 5 to be performed. The surrounding environment and especially the waves result in external forces on the tower 1 which make it oscillate as shown by the arrow M. These movements make it harder to mount the rotor blades 5, and in very harsh weather conditions, it may be necessary to postpone the further installation work in order not to damage the components and equipment and to ensure the safety of the people performing the installation work. As shown in FIG. 1.b, a first end 6 of a tensioner 7 is fastened to the tower 1 at an upper region of the tower 1 adjacent to the nacelle 3. Such a tensioner 7 may e.g. be a rope or a wire, such as a Dynemaa® rope as described above. A second end 8 of the tensioner 7 is fastened to a holding device 9 floating in the sea 10 at a distance from the tower 1. In FIG. 1.b, the holding device 9 is shown schematically as a tug boat; different examples of such a holding device 9 will be described in more details below. A pulling force F is applied to the tensioner 7 from the holding device 9 at least part of the time while the rotor blades 5 are being mounted to the hub 4, so that oscillations M of the tower 1 due to external forces are dampened during installation of the rotor blades 5 resulting in the final wind turbine 2 as shown in FIG. 1.c.

Figure 2:
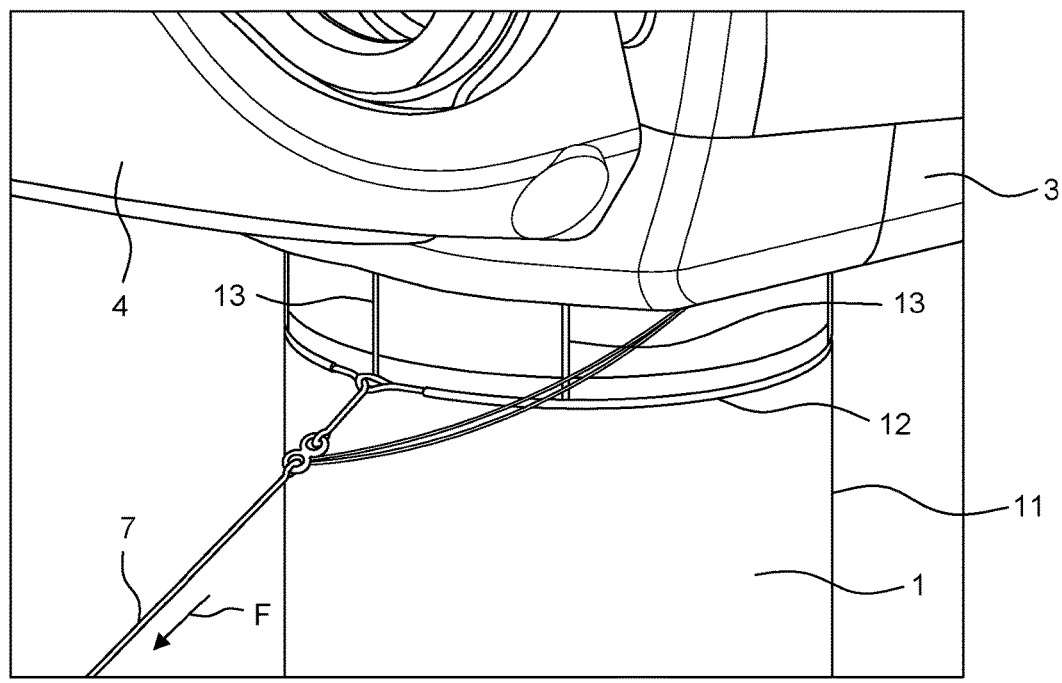
FIG. 2 shows a partial view of an example of how the tensioner can be fastened to the upper part of the tower.

FIG. 2 shows schematically a partial view of the upper region of the tower 1 wherein a part of the tensioner 7 is arranged circumferentially around the outer surface 11 of the tower 1. In this embodiment, the part of the tensioner 7 that is in contact with the outer surface 11 of the tower 1 is covered by a sleeve 12 made of a material having a higher frictional coefficient in relation to the outer surface 11 than a corresponding frictional coefficient of the part of the tensioner 7 not being provided with the sleeve 12. Hereby it can be obtained that the tensioner 7 stays in the desired location in relation to the tower 1 when the pulling force F in the tensioner 7 results in frictional forces between the sleeve 12 and the outer surface 11 of the tower 1. In the illustrated embodiment, additional holding straps 13, such as ratchet straps, are arranged connected to e.g. the nacelle 3 or the hub 4 in order to hold the tensioner 7 with the sleeve 12 in the correct position when the pulling force F is applied. The scope of protection also covers other ways of fastening the tensioner 7, such as fastening it to a top frame (not shown) of the nacelle or to the turntable (not shown) of the tower.

Figure 3:
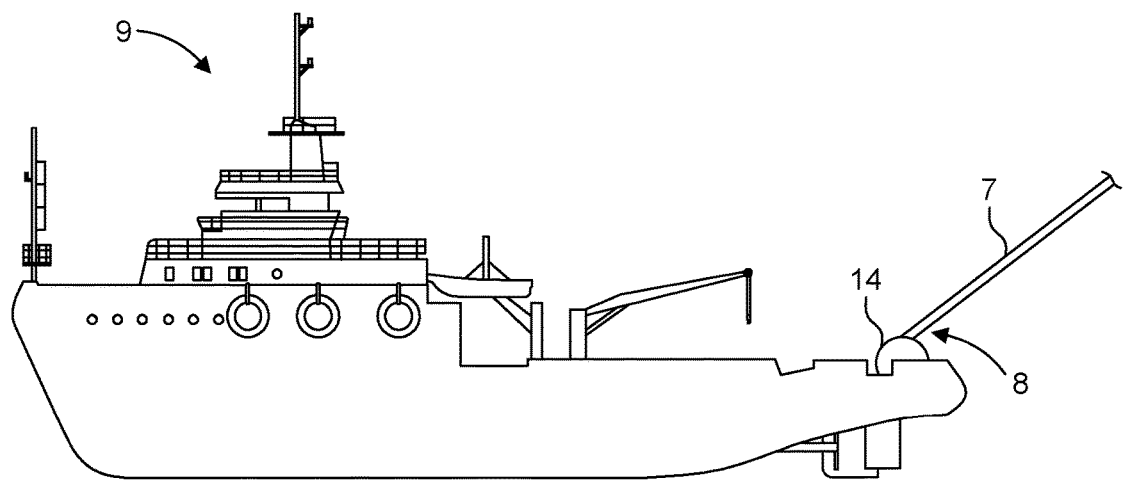
FIG. 3 shows schematically an embodiment of the invention, wherein the holding device is a tug boat.

FIG. 3 shows schematically an embodiment of the invention, wherein the holding device 9 is a tug boat having a winch 14 around which the second end 8 of the tensioner 7 is wound. Such a winch 14 can be used to adjust a distance between the first and second ends 6,8 of the tensioner 7 so that the pulling angle can be as desired depending of the height above the sea level of the fastening point. The winch 14 can also be a tension-controlled winch which can be used to adjust the force F applied to the tensioner 7. Which pulling force F to apply will typically be predetermined based on one or more of the following parameters: height of the tower, measured oscillations of the tower at a specific height above the sea level, dimensions of the blades, the type of holding device, and the conditions of the sea. The relationships between these parameters can be studied as part of the development work and will preferably include the use of both computer simulations and physical tests. It may also be desired to develop standards and test protocols to be followed in order to ensure that the installation work meets all relevant safety standards. The choice of which pulling force F to apply can e.g. be determined based on simplified models assuming e.g. that the mass of the nacelle and the hub is a point load acting at the upper end of a tower estimated as a beam. Another possible assumption could be that the un-dampened movements are sinusoidal and have a constant amplitude. More precise simulations would need more real models of the system, and they could also be combined with measurement from former tests. It would also be possible to vary the applied force during the installation work, if desired.

Tests have been performed in relation to the invention where the tensioner was fastened at the first end in a height of approximately 105 m above sea level. The tug boat was arranged approximately 210 m from the tower, and a pulling force was applied. The test results show that at a pulling force of 30 tonnes, some dampening of the oscillations were obtained. The test ended before the desired pulling force was reached, and therefore further tests will be conducted during the further work on the design of the installation process. The tests showed that it was hereby possible to dampen the oscillations significantly.

The winch may include a braking mechanism. Such braking mechanism may be utilised so that when the upper region of the tower moves away from the winch, the braking mechanism may in itself act as a damper by providing a controlled attempt to prevent or dampen the motion by braking. When the upper region of the tower moves towards the winch and/or vessel, then the winch may spool in with the same speed or similar speed to the speed with which the upper region of the tower moves.

With an installation vessel or similar having a certain width or length, and two when two winches are provided with a distance apart on the vessel, and each winch has a tensioner attached to the upper region of the tower, then one of the winches can brake in a controlled manner while spooling out, while the other winch can spool in, and vice versa, in dependence of the direction of the upper region of the tower, so as hereby to cooperate to dampen the movement of the tower.

The winches may as example have a capability of about 5-25 kW, such as 15-25 kW, and may have a capability of winding in and out of 0.25 m/s-3 m/s, such as between 0.5 m/s and 1.5 m/s. With these capabilities, an effect of the waves of the sea can also be taken into account.

Figure 4:
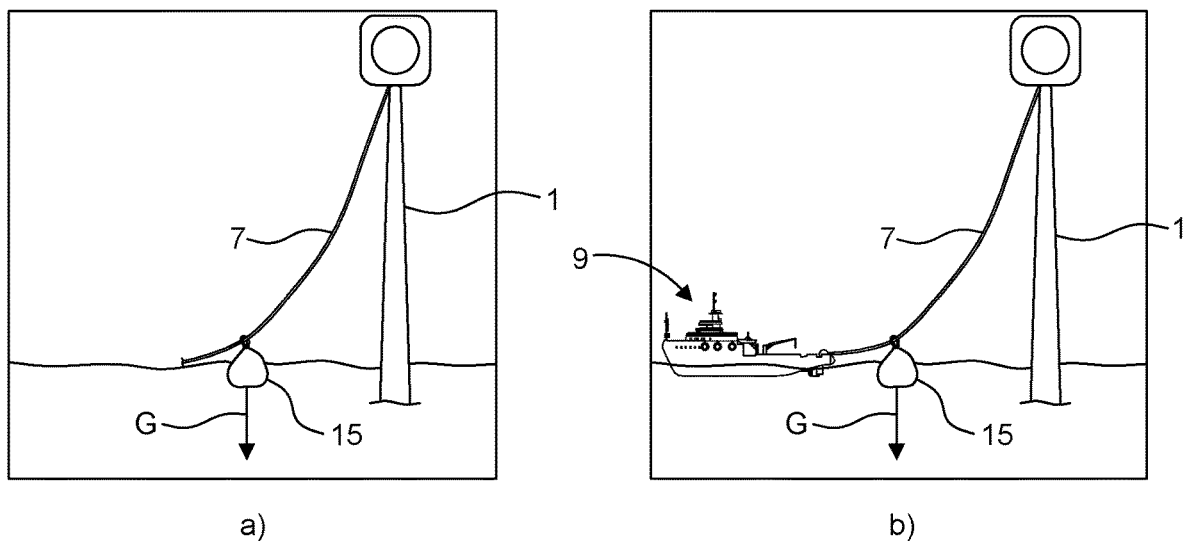
FIG. 4 shows schematically two embodiments of the invention, wherein the holding device is an un-powered float.

FIG. 4 shows schematically two other embodiments of the invention, wherein the holding device 9 is an un-powered float 15. FIG. 4.a shows the float 15 in the form of a block of material that has a given mass which thereby applies the desired tensile force to the tensioner 7 due to the gravitational force G acting on the block and thereby dampens the oscillations of the tower 1. Such a float 15 acts as a floating anchor also known for anchoring of a vessel. FIG. 4.b shows an embodiment in which the un-powered float 15 is connected to a powered vessel 9 that can be used to move the un-powered float 15 between different locations with respect to the tower 1 and to change the applied force.

Figure 5:
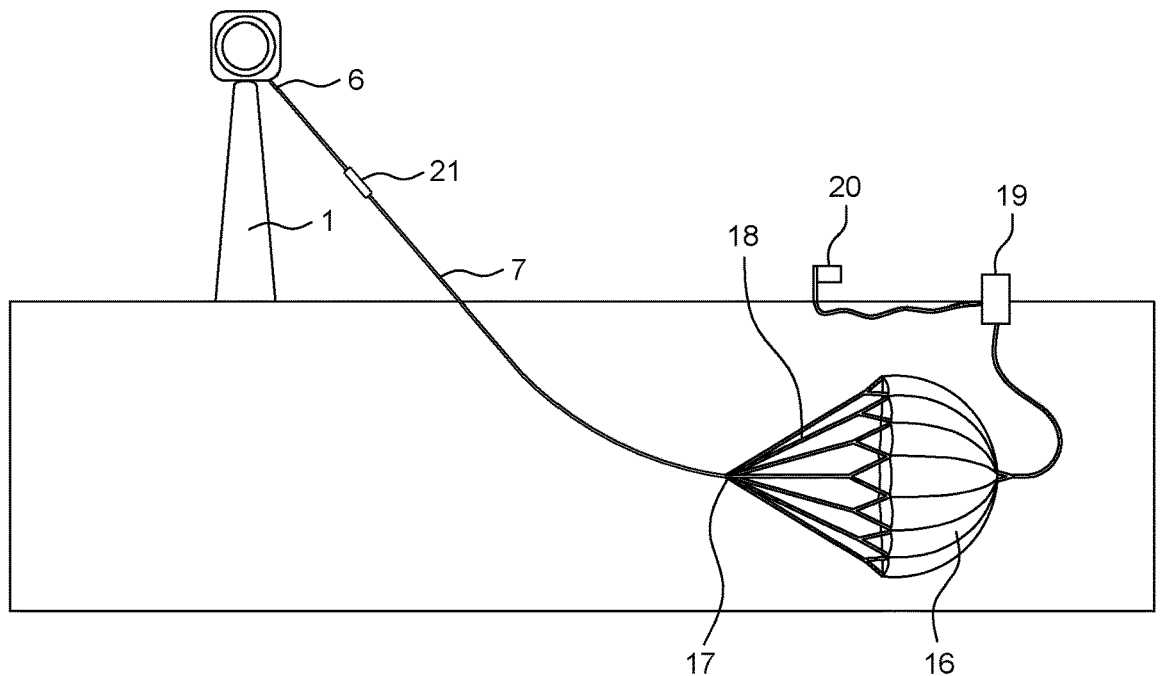
FIG. 5 shows schematically an embodiment in which the holding device is an un-powered float in the form of a horizontally arranged parachute-like device.

FIG. 5 shows schematically an un-powered float in the form of a parachute-like construction that will apply a horizontal force component due to the large area providing resistance against movements. The parachute 16 has a swivel cane 17 to which a tensioner 7 in the form of a rope is fastened, the rope being connected to the tower 1 at the first end 6. From the swivel cane 17 a plurality of shrouds 18 extend to the parachute 16 itself. In the illustrated embodiment, the parachute 16 is connected to a float deployment bag 19 in which it has been stored until deployment. This float deployment bag 19 is shown connected to a recovery float 20 so that it is easier to locate the parachute 16 which is below sea level.

Studies made during the development of the present invention have shown that it is often easiest to obtain the desired dampening effect by ensuring that a horizontal component of the pulling force F is in a main direction of the surrounding waves at the installation site. The best results seem to be obtained when pulling in the propagation direction of the waves. However, if this is not possible e.g. due to the location of the installation vessel (not shown), a good alternative will be to pull against the waves. Yet another option will be to use a plurality of tensioners 7 and a corresponding number of holding devices 9 simultaneously to apply tensioning forces F in more directions to the tower 1.

Figure 6:
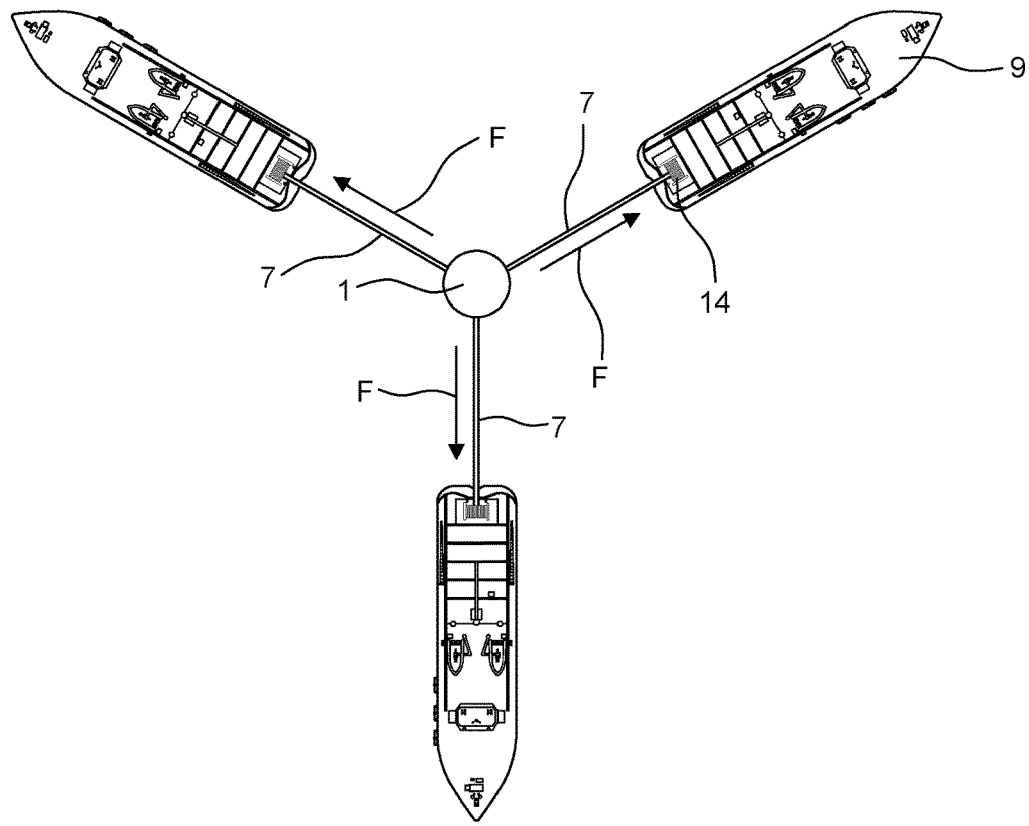
FIG. 6 shows schematically how a plurality of holding devices can be used simultaneously.

Such a set-up is shown schematically as a top view in FIG. 6. This figure shows three boats 9 applying pulling forces F away from the tower 1 in three directions equally spaced around the tower 1. However, other numbers of holding devices 9 can also be used, they do not need to be equally spaced, and they do not need to be the same type. It could e.g. be a combination of a tug boat pulling in the wave direction and a floating anchor arranged in the opposite direction with respect to the tower.

In any of the embodiments shown in the previous figures, it will be possible to let the tensioner 7 have a local region 21 with a lower tensile strength than the rest of the tensioner 7. A local region 21 of lower strength is shown schematically in FIG. 5. Such a local region 21 could e.g. be established by a bolt connection having a predetermined tensile strength. The local region 21 can e.g. be located between 30 and 100 m, such as between 40 and 60 m, from the position where the first end 6 of the tensioner 7 is fastened to a part of the wind turbine 2. As described in more details above, such a local region 21 of lower strength can be used to keep control of where the tensioner 7 will be break so that it can be in a region where the consequences of a fracture is as un-critical as possible in relation to the people performing the installation, to the surrounding equipment, such as the holding device, and to the wind turbine being installed.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Furthermore, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of installing rotor blades on an offshore wind turbine, the method comprising the steps of:
    arranging a tower of the wind turbine at an offshore installation site, the tower having a nacelle and a hub mounted thereon,
    fastening a first end of a tensioner to at least one of the tower, the nacelle, and the hub at a distance above sea level,
    fastening a second end of the tensioner to a holding device floating in the sea at a distance from the tower, and
    applying a pulling force to the tensioner from the holding device at least part of the time while the rotor blades are being mounted to the hub, so that oscillations of the tower due to external forces are dampened during installation of the rotor blades.

2. The method according to claim 1, wherein the first end of the tensioner is fastened to the tower at an upper region of the tower adjacent to the nacelle.

3. The method according to claim 2, wherein a part of the tensioner is arranged circumferentially around an outer surface of the tower, and wherein the part of the tensioner that is in contact with the outer surface of the tower is covered by a sleeve made of a material having a higher frictional coefficient in relation to the outer surface than a corresponding frictional coefficient of the part of the tensioner not being provided with the sleeve.

4. The method according to claim 1, wherein the tensioner has a local region having a lower tensile strength than the rest of the tensioner.

5. The method according to claim 4, wherein the local region is established by a bolt connection having a predetermined tensile strength.

6. The method according to claim 4, wherein the local region is located between 30 and 100 m from the position where the first end of the tensioner is fastened to the wind turbine.

7. The method according to claim 1, wherein at least a part of the tensioner is a rope made from ultra-high-molecular-weight polyethylene (UHMWPE).

8. The method according to claim 1, wherein the holding device is a powered vessel.

9. The method according to claim 8, wherein the vessel comprises a winch around which the second end of the tensioner is wound so that the winch can be used to adjust a distance between the first and second ends of the tensioner and/or a pulling force applied to the tensioner.

10. The method according to claim 8, wherein the powered vessel includes a tug boat.

11. The method according to claim 1, wherein the holding device is an un-powered float.

12. The method according to claim 11, wherein the un-powered float is connected to a powered vessel that can be used to move the un-powered float between different locations with respect to the tower.

13. The method according to claim 1, wherein a horizontal component of the pulling force is in a main direction of surrounding waves at the installation site.

14. The method according to claim 1, wherein the pulling force is predetermined based on one or more of the following parameters: height of the tower, measured oscillations of the tower at a specific height above the sea level, dimensions of the rotor blades, type of holding device, and conditions of the sea.

15. The method according to claim 1, wherein the tensioner is one of a plurality of tensioners, wherein the holding device is one of a plurality of holding devices, and wherein the plurality of tensioners and the plurality of holding devices are used simultaneously to apply tensioning forces in multiple directions to the tower.

* * * * *